(12) United States Patent
Robbins (10) Patent No.: US 8,989,535 B2
(45) Date of Patent: Mar. 24, 2015

(54) MULTIPLE WAVEGUIDE IMAGING STRUCTURE

(75) Inventor: Steven John Robbins, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 400 days.

(21) Appl. No.: 13/488,145

(22) Filed: Jun. 4, 2012

(65) Prior Publication Data

US 2013/0322810 A1    Dec. 5, 2013

(51) Int. Cl.
| | |
|---|---|
| G02B 6/42 | (2006.01) |
| G02B 6/00 | (2006.01) |
| G02B 6/26 | (2006.01) |
| G02F 1/00 | (2006.01) |
| G09G 5/00 | (2006.01) |
| G03B 21/00 | (2006.01) |
| G02B 27/28 | (2006.01) |

(Continued)

(52) U.S. Cl.
CPC ............ *G02B 6/4206* (2013.01); *G02B 5/30* (2013.01); *G02B 6/00* (2013.01); *G02B 6/0056* (2013.01); *G02B 6/2726* (2013.01); *G02B 27/0172* (2013.01); *G02B 2027/0125* (2013.01); *G02B 2027/0178* (2013.01); *Y10S 385/901* (2013.01)
USPC ............. 385/27; 385/11; 385/16; 385/31; 385/39; 385/50; 385/129; 385/901; 349/11; 349/117; 349/193; 349/196; 345/7; 345/8; 353/8; 359/630

(58) Field of Classification Search
USPC ........... 385/11, 16–21, 27, 31, 39, 47, 50, 51; 349/5–12, 15, 18, 96, 117, 193–194, 349/196; 345/7–9; 353/7–8; 359/320, 359/489.01, 489.06, 489.08, 629–640
See application file for complete search history.

(56) References Cited

U.S. PATENT DOCUMENTS

| | | |
|---|---|---|
| 7,261,453 B2 | 8/2007 | Morejon et al. |
| 7,909,958 B2 | 3/2011 | Washburn et al. |

(Continued)

OTHER PUBLICATIONS

Large, M. J., et al., "Parallel Optics in Waveguide Displays: a Flat Panel Autostereoscopic", *Display Technology, Journal of*, Retrieved from <http://download.microsoft.com/download/D/2/E/D2E425F8-CF3C-4C71-A4A2-70F9D4081007/ParallelOpticsinWaveguideDisplaysMS090925.Final.pdf>, (Jun. 21, 2010), pp. 1-7.

(Continued)

*Primary Examiner* — Akm Enayet Ullah
*Assistant Examiner* — Michael Mooney
(74) *Attorney, Agent, or Firm* — Micah Goldsmith; Judy Yee; Micky Minhas (57) ABSTRACT

In embodiments of a multiple waveguide imaging structure, an imaging structure includes a first waveguide for see-through viewing of an environment at a first field of view, and includes a second waveguide for see-through viewing of the environment at a second field of view. The first and second waveguides each include a polarizing beam splitter to reflect light that enters at a first polarization orientation angle in the respective first and second waveguides, and the polarizing beam splitters pass through the light that enters at a second polarization orientation angle. The imaging structure also includes a polarization switch to rotate the polarization of the light through the first and second polarization orientation angles.

12 Claims, 5 Drawing Sheets

(51) Int. Cl.
*G02B 5/30* (2006.01)
*G02B 27/01* (2006.01)
*F21V 8/00* (2006.01)
*G02B 6/27* (2006.01)

(56) References Cited

U.S. PATENT DOCUMENTS

2010/0002989 A1 1/2010 Tokushima
2011/0205251 A1 8/2011 Auld
2011/0221658 A1 9/2011 Haddick et al.

OTHER PUBLICATIONS

Travis, Adrian et al., "Collimated Light from a Waveguide for a Display Backlight", *Optics Express*, Retrieved from <http://download.microsoft.com/download/D/2/E/D2E425F8-CF3C-4C71-A4A2-70F9D4081007/OpticsExpressbacklightpaper.pdf>,(Oct. 15, 2009), pp. 19714-19719.

MULTIPLE WAVEGUIDE IMAGING STRUCTURE

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device.

A waveguide display can be implemented in a wearable display device as a near-eye display panel. However, conventional waveguide displays are limited in field of view because of the limited range of angles to propagate light down the waveguide and due to the fixed mechanisms for pushing light into and out of a waveguide. One technique is to stack two waveguides on top of or next to each other with an airspace between the two waveguides. However, disadvantages of this technique include the need for collimation optics for each waveguide, which adds complexity and bulk to a display system. The collimation optics for each waveguide typically add too much bulk for a waveguide display to be implemented as lenses in a wearable display device.

SUMMARY

This Summary introduces simplified concepts of a multiple waveguide imaging structure, and the concepts are further described below in the Detailed Description and/or shown in the Figures. This Summary should not be considered to describe essential features of the claimed subject matter, nor used to determine or limit the scope of the claimed subject matter.

A multiple waveguide imaging structure is described. In embodiments, an imaging structure includes a first waveguide for see-through viewing of an environment at a first field of view, and includes a second waveguide for see-through viewing of the environment at a second field of view. The first and second waveguides each include a polarizing beam splitter to reflect light into the waveguide that enters at a first polarization orientation angle in the respective first and second waveguides, and the polarizing beam splitters pass through the light that enters at a second polarization orientation angle (e.g., at an orthogonal polarization orientation angle). The imaging structure also includes a polarization switch to rotate or cycle the polarization of the light through the first and second polarization orientation angles. The first field of view of the first waveguide is combined with the second field of view of the second waveguide for a wider field of view. The polarization switch rotates the polarization of the light to time-sequentially create the wider field of view.

In embodiments, the light is a virtual image that is generated to appear as part of the environment when viewed through the imaging structure. The light of the virtual image that enters the first and second waveguides at the first polarization orientation angle is propagated in the respective first and second waveguides. The light of the virtual image that enters the first waveguide at the second polarization orientation angle is passed through the first waveguide and is reflected into the second waveguide. The imaging structure includes a half waveplate to change the light that passes through the first waveguide from the second polarization orientation angle back to the first polarization orientation angle, and then the light enters the second waveguide at the first polarization orientation angle.

BRIEF DESCRIPTION OF THE DRAWINGS

Embodiments of a multiple waveguide imaging structure are described with reference to the following Figures. The same numbers may be used throughout to reference like features and components that are shown in the Figures.

DETAILED DESCRIPTION

Embodiments of a multiple waveguide imaging structure are described. An imaging structure can be implemented with multiple waveguides to increase the field of view for near-eye display panels that are used as lenses in a wearable display device. Rather than having collimation optics for each waveguide, which adds too much bulk to a waveguide display lens for a wearable display device, the imaging structure utilizes a polarization switch that rotates the polarization of the light to time-sequentially create an overall wider field of view from combined fields of view of the multiple waveguides. The polarized light that enters into the waveguides of the imaging structure can then be propagated in a waveguide, such as for light that enters at a first polarization orientation angle, or the light can be passed through the waveguide, such as for light that enters at a second polarization orientation angle (e.g., at an orthogonal polarization orientation angle). Embodiments of a multiple waveguide imaging structure can be implemented for virtual-reality and augmented-reality displays, and is also applicable to displays for handheld devices.

While features and concepts of a multiple waveguide imaging structure can be implemented in any number of different devices, systems, environments, and/or configurations, embodiments of a multiple waveguide imaging structure are described in the context of the following example devices, systems, and methods.

Figure 1:
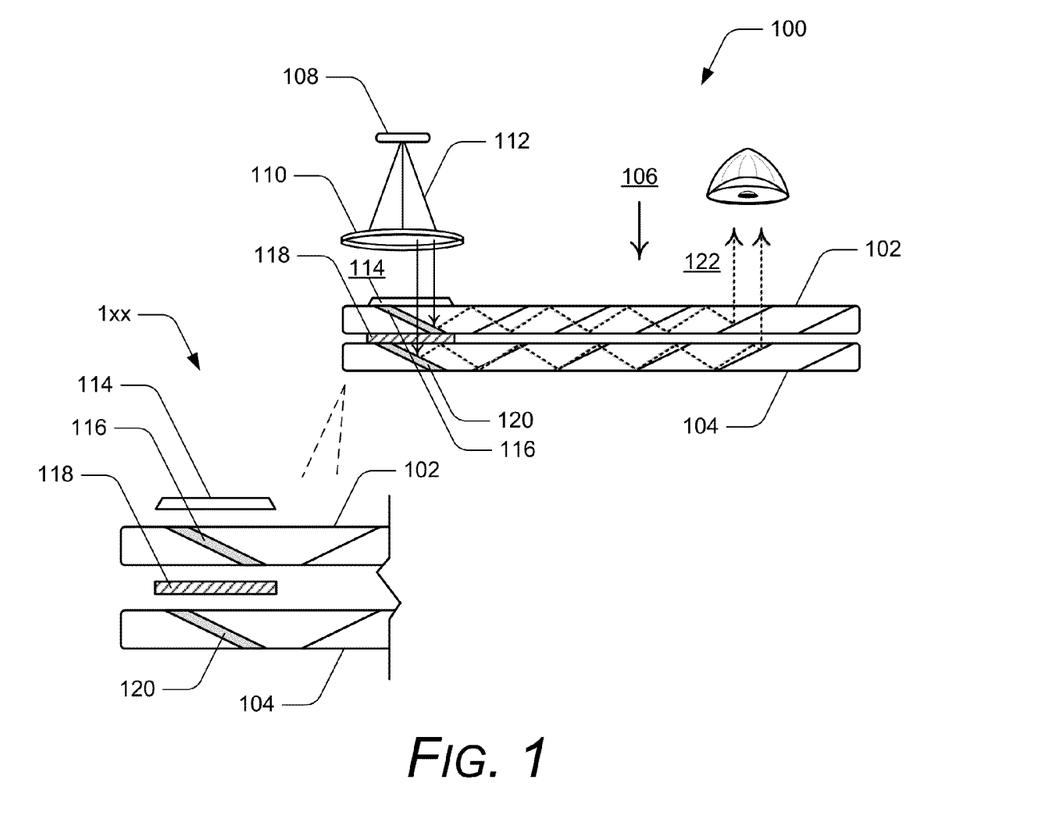
FIG. 1 illustrates an example imaging structure in accordance with one or more embodiments of a multiple waveguide imaging structure.

FIG. 1 illustrates an example imaging structure 100 that is a multiple waveguide imaging structure in accordance with embodiments described herein. The example imaging structure 100 includes a first waveguide 102 and a second waveguide 104 for see-through viewing of an environment that is viewable through the imaging structure, such as for a user viewing the environment from a perspective 106. The imaging structure also includes an image microdisplay 108 and an imaging optic 110 that implements an input mechanism to direct the light 112 of a generated, virtual image into the waveguides where the light of the virtual image is then propagated in the waveguides.

The image microdisplay 108 can be implemented as a liquid crystal on silicon (LCOS) microdisplay that projects the light of the virtual image through the imaging optic 110 into the waveguides. The imaging optic can be implemented as a collimating lens, and the light through the LCOS and imaging optic is polarized. In implementations, the input mechanism (e.g., the image microdisplay 108 and imaging optic 110) may be combined with any other lenses and/or optics components.

The example imaging structure 100 also includes a polarization switch 114 that is implemented to rotate or cycle the polarization of the light 112 through polarization orientation angles before the light is reflected into the waveguides. The waveguides include output reflectors that are angled so that the first waveguide 102 has a first field of view and the second waveguide 104 has a different, second field of view. When combined (e.g., the waveguides are stacked), the first field of view of the first waveguide is combined with the second field of view of the second waveguide for an overall wider field of view. The polarization switch 114 is implemented to rotate the polarization of the light to time-sequentially create the wider field of view based on the combination of the first and second fields of view of the waveguides.

The waveguide 102 includes a polarizing beam splitter 116 or other type of optical filter to reflect the light that enters at a first polarization orientation angle so that the light propagates down the waveguide. The polarizing beam splitter 116 is implemented to also pass through the light that enters the waveguide at a second polarization orientation angle as the polarization switch rotates or cycles the polarization of the light through the first and second polarization orientation angles. The imaging structure 100 also includes a half waveplate 118 that is implemented to change the light (e.g., alter the polarization state of the light) that passes through the first waveguide 102 from the second polarization orientation angle back to the first polarization orientation angle so that the light enters the second waveguide 104 at the first polarization orientation angle. The waveguide 104 also includes a polarizing beam splitter 120 or other type of optical filter to reflect the light that enters at the first polarization orientation angle so that the light propagates down the waveguide.

In embodiments, the imaging structure 100 can be implemented in an imaging unit of a head-mounted display (HMD), such as glasses or other type of wearable display device. An imaging unit that incorporates the imaging structure 100 can generate a virtual image to appear as part of the environment for augmented-reality imaging and/or viewing. Waveguide optics can be implemented to collimate light and then reflect the light into the waveguides by diffractive or reflective components, such as any type of optics, lenses, or other light-directing mechanisms. The components for extracting light out of the waveguides and projecting the light of an image for viewing at 122 can also be diffractive or reflective. In alternate implementations, the waveguides can be implemented with any type of diffractive input devices that are polarization sensitive, such as Switchable Bragg Gratings, Thick Phase Gratings, etc. in embodiments of a multiple waveguide imaging structure.

Figure 2:
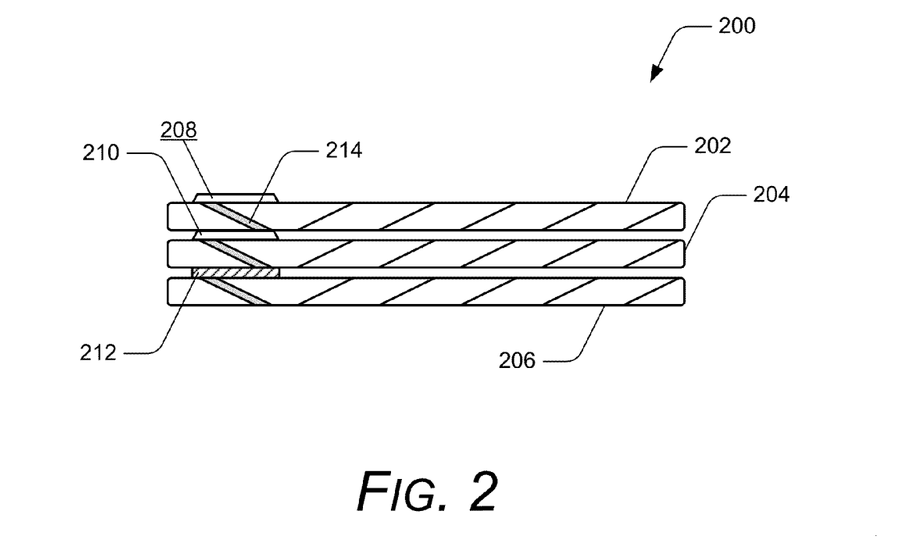
FIG. 2 illustrates another example imaging structure in accordance with one or more embodiments of a multiple waveguide imaging structure.

FIG. 2 further illustrates another example imaging structure 200 that is similar to the example imaging structure 100 shown and described with reference to FIG. 1. The example imaging structure 200 includes a first waveguide 202, a second waveguide 204, and at least a third waveguide 206 for see-through viewing of an environment that is viewable through the imaging structure. The imaging structure 200 also includes polarization switches 208 and 210 to rotate or cycle the polarization of the light through polarization orientation angles before the light is reflected into the waveguides. An example of the polarization switches is described with reference to the polarization switch 114 shown in FIG. 1. Additionally, the imaging structure 200 includes a half waveplate 212 positioned between the second waveguide 204 and the third waveguide 206. An example of the half waveplate is described with reference to the half waveplate 118 shown in FIG. 1.

In addition to polarizing beam splitters 214 (e.g., optical filters), the waveguides include output reflectors that are angled so that the first waveguide 202 has a first field of view, the second waveguide 204 has a different, second field of view, and the third waveguide 206 has another different, third field of view. When combined (e.g., the waveguides are stacked), the first field of view of the first waveguide is combined with the second field of view of the second waveguide and with the third field of view of the third waveguide for an overall wider field of view. Although only three waveguides are implemented in this example imaging structure 200, any number of multiple waveguides can be stacked to increase the overall field of view through the imaging structure. The polarization switches 208 and 210 are implemented to rotate the polarization of the light to time-sequentially create the wider field of view based on the combination of the first, second, and third fields of view of the waveguides.

Figure 3:
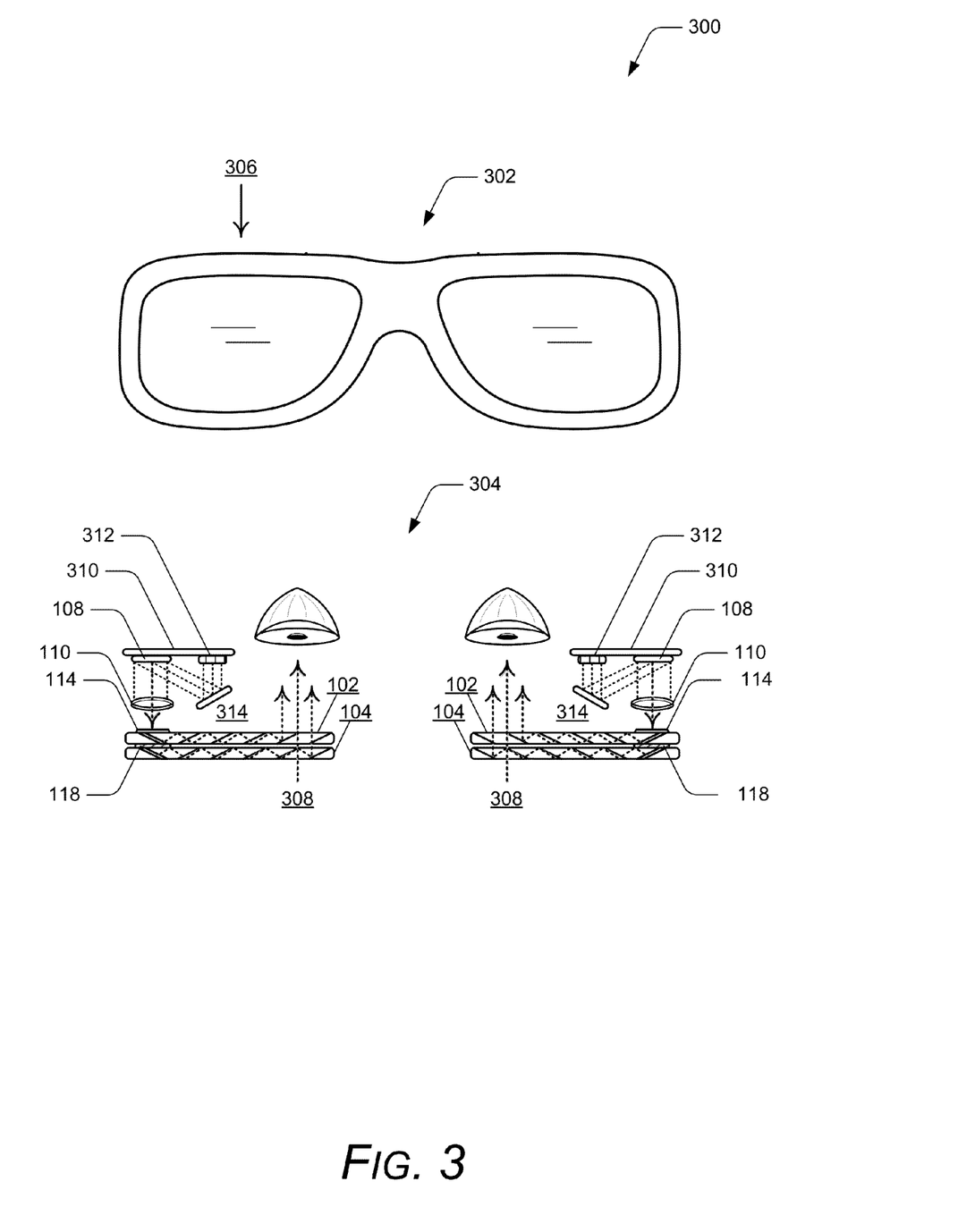
FIG. 3 illustrates an example system that includes examples of imaging units in which embodiments of a multiple waveguide imaging structure can be implemented.

FIG. 3 illustrates an example system 300 in which various embodiments of a multiple waveguide imaging structure can be implemented. An example wearable display device 302 includes left and right display lens systems with imaging units, such as imaging units 304 that are viewed from a perspective 306 of the wearable display device, as if viewing the display lens systems from the top of the device. In embodiments, the imaging units 304 can be implemented as left and right display lens systems of the wearable display device described with reference to FIG. 4. A wearable display device can be implemented as any type of glasses or head-mounted display (HMD) that includes implementations of the imaging units 304 (e.g., left and right display lens systems) through which a user can view the surrounding environment, yet also see virtual images that are generated for display and appear as a part of the environment. References to a left imaging unit and a right imaging unit, as described herein, correlate to a user's left and right eyes (e.g., from the perspective of wearing and looking through the wearable display device). Alternatively, the left and right imaging units may be described from the perspective of looking at the wearable display device.

The imaging units 304 include examples of the imaging structure 100 as shown and described with reference to FIG. 1. For example, the imaging units include the first and second waveguides 102 and 104, as well as the polarization switch 114 and the half waveplate 118. The imaging units also include the input mechanism (e.g., the image microdisplay 108 and imaging optic 110) to direct the light of a virtual image into the waveguides where the light of the virtual image is then propagated through the waveguides. In this example, the imaging units 304 can be implemented with any number of micro display panels, imaging structures with direct emitters, lenses, and reflecting elements to display and project a virtual image into a see-through and reflecting waveguide.

The see-through, reflecting waveguides 102 and 104 are display optics implemented for internal reflection that conduct visible light of a virtual image that is generated by the imaging units 304 and projected for viewing by a user. The waveguides also passes through light 308 of an image from the surrounding environment for viewing by the user (e.g., an image of the environment as viewed through the wearable display device). An imaging unit 304 with an imaging structure can also be implemented with components of the display lens system described with reference to FIG. 4 to implement embodiments of a multiple waveguide imaging structure.

In embodiments, the imaging units 304 each include a printed circuit board 310 that incorporates an emitter structure 312, which direct emits the light that is reflected by a reflecting mirror 314 to illuminate the image microdisplay 108. The imaged light is then directed through the imaging optic 110 that directs the light into the waveguides 102 and 104. The emitter structure 312 can be implemented with lasers that direct emit the light, and a reflective spatial light modulator can be implemented as the microdisplay using the lasers for illumination.

Figure 4:
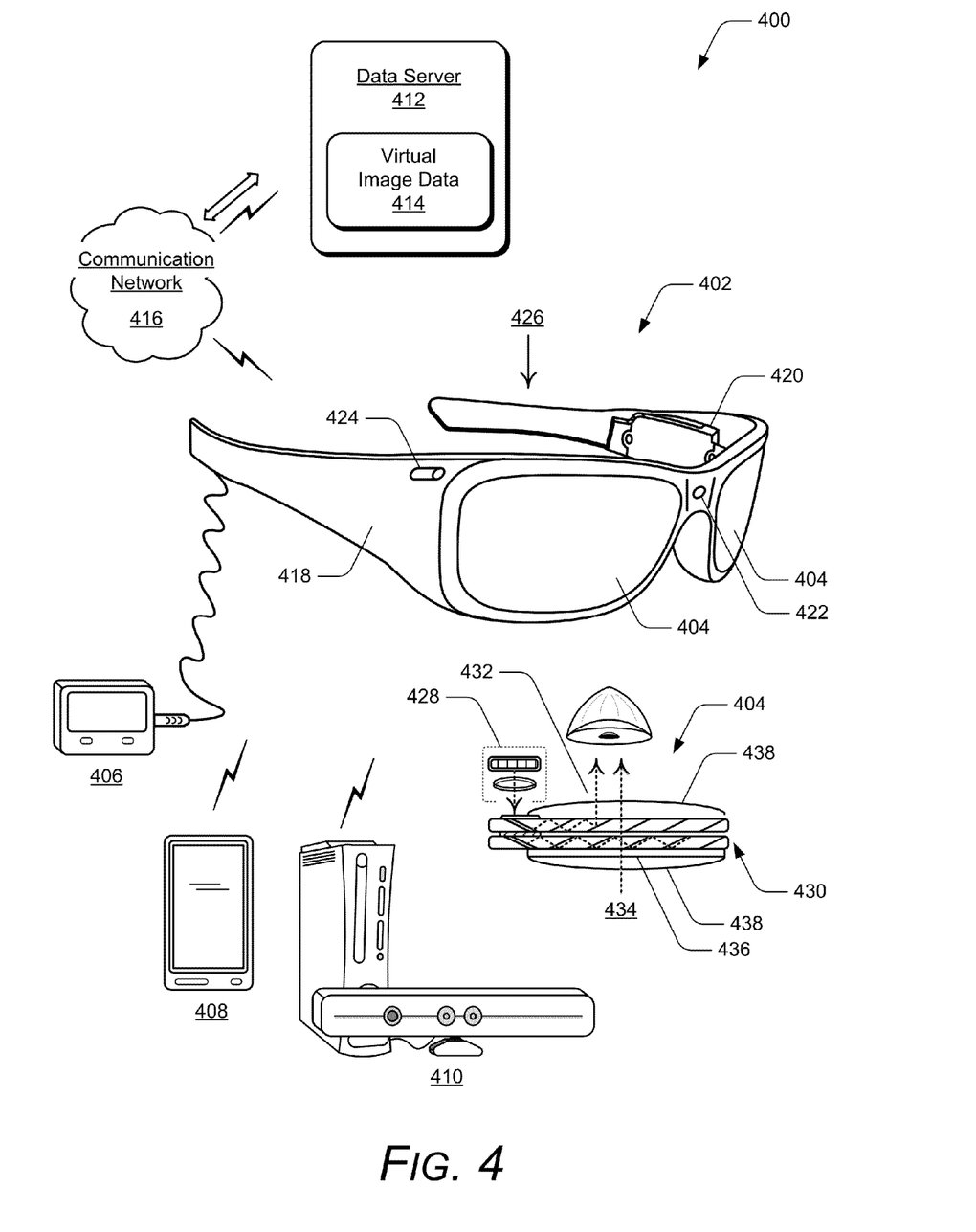
FIG. 4 illustrates an example system that includes an example of a wearable display device in which embodiments of a multiple waveguide imaging structure can be implemented.

FIG. 4 illustrates an example system 400 that includes an example wearable display device 402 in which embodiments of a multiple waveguide imaging structure can be implemented. The wearable display device can be implemented as any type of glasses or head-mounted display (HMD) that includes display lens systems 404 (e.g., left and right display lens systems) through which a user can view the surrounding environment, yet also see virtual images (e.g., any type of object, video, text, graphic, and the like) that are generated for display and appear as a part of the environment.

The wearable display device 402 can be implemented as an independent, portable system that includes memory, software, a processor, and/or a power source. Alternatively or in addition, the wearable display device may be communicatively linked to a controller 406 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 6. For example, the controller and/or the wearable display device includes an imaging application implemented as computer-executable instructions, such as a software application, and executed by a processor to implement embodiments of a multiple waveguide imaging structure as described herein.

In embodiments, the controller may be implemented as a dedicated device (e.g., the wired controller 406), as a mobile phone 408, a tablet or other portable computer device, a gaming system 410, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 400 also includes a data server 412, or data service, that communicates, or otherwise distributes, virtual image data 414 to the wearable display device 402 via a communication network 416. For example, the data server may be part of a network-based gaming system that generates virtual images for augmented reality display at the wearable display device. Alternatively, the data server may be part of a navigation system that communicates navigation directions and information for display in the display lens systems 404 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 416, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 402 includes a frame 418, such as in the form of glasses, goggles, or any other structure, that supports and incorporates the various components of the device, as well as serves as a conduit for electrical and other component connections. A components module 420 (or components modules on the left, right, and/or both sides of the device frame) incorporates any of the various components, such as processing and control circuitry, memory, software, a processor, GPS transceiver, and/or power source. The wearable display device may also include a microphone 422 to record audio data from the surrounding environment, as well as ear phones for audio feedback as part of an augmented reality experience.

The wearable display device 402 also includes various cameras 424 that capture video and still images of the surrounding environment. The image and video data can be processed on the device and/or by a controller device (e.g., controller 406), and used to create a mapping field to orient and track a user in the environment space. The wearable display device can also include eye-tracking cameras used to determine a user eyeball and/or pupil location, and to track eye movements. The wearable display device may also include a temperature sensor, as well as inertial sensors and/or attitude sensors, including MEMS gyros, magnetic sensors (e.g., a compass), and acceleration sensors for sensing position, orientation, and acceleration of the wearable display device.

An example of one display lens system 404 is shown from a viewer perspective 426 of the wearable display device 402, as if viewing the display lens system from the top of the device. The display lens system includes an imaging system 428, which can be implemented with any number of micro display panels, lenses, and reflecting elements to display and project a virtual image into a see-through and reflecting waveguide 430. A display lens system 404 can also be implemented as the imaging units described with reference to FIG. 3 that incorporate any of the imaging structures described with reference to FIGS. 1 and 2 to implement embodiments of a multiple waveguide imaging structure. The see-through, reflecting waveguides 430 are is implemented for internal reflection and conducts the visible light 432 of a virtual image that is generated by the imaging unit for viewing by a user, and also passes through the light 434 from the surrounding environment for viewing by the user.

The micro display panels, lenses, and/or reflecting elements of the imaging system 428 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 428 (or other components of a display lens system 404) can be implemented to include an infra-red (IR) laser utilized for system calibrations and/or as an illumination source for an eye-tracking system and camera that tracks the position of a user's eyes and/or pupils. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. Alternatively or in addition, sensors can be implemented in a CMOS driver array to detect the feedback. In implementations, the light reflections (e.g., the IR return) may be directed with SBG or SRB methods. The see-through and reflecting waveguides 430 can also be utilized for the infrared illumination, and for eyeball reflections that the eye-tracking system uses to track the position of the user's eyes and/or pupils.

In this example, the display lens systems 404 include an optional opacity filter 436, and a see-through lens 438 on each side of the waveguides 430. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 500 is described with reference to FIG. 5 in accordance with one or more embodiments of a multiple waveguide imaging structure. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
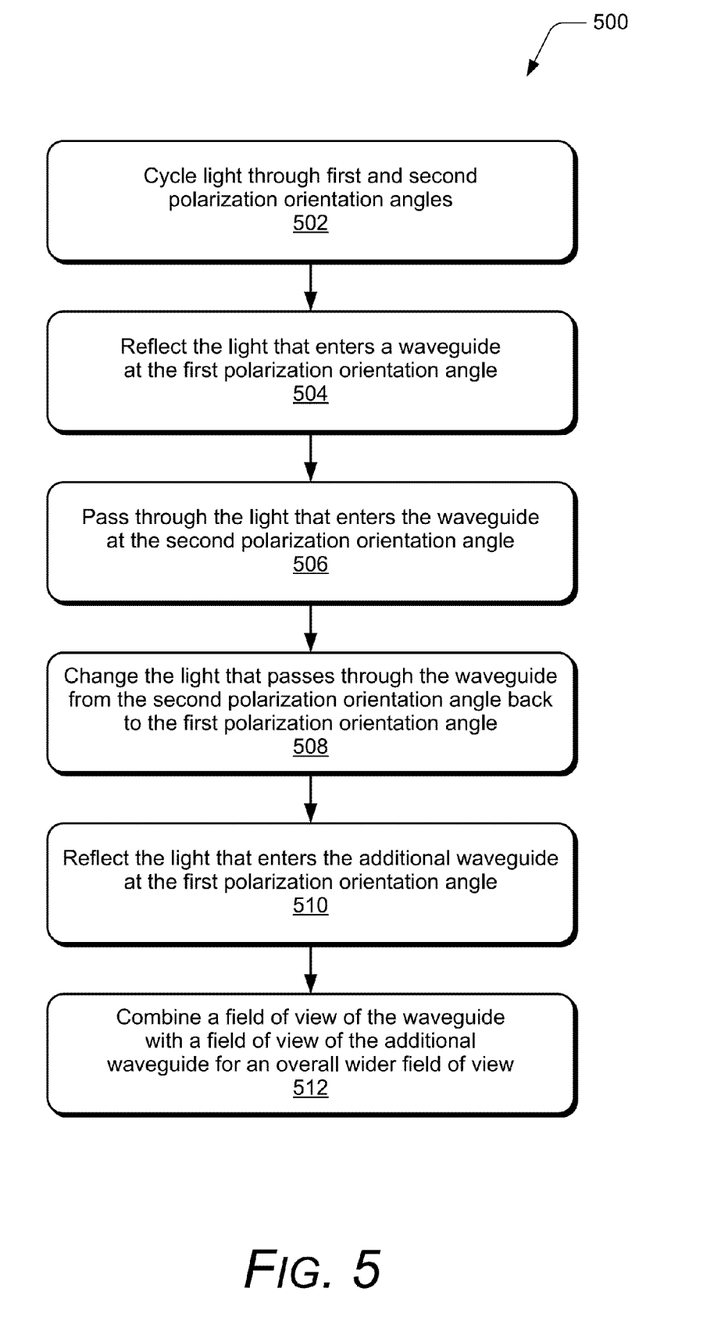
FIG. 5 illustrates example method(s) of a multiple waveguide imaging structure in accordance with one or more embodiments.

FIG. 5 illustrates example method(s) 500 of a multiple waveguide imaging structure. The order in which the method blocks are described are not intended to be construed as a limitation, and any number of the described method blocks can be combined in any order to implement a method, or an alternate method.

At block 502, light is cycled through first and second polarization orientation angles. For example, the polarization switch 114 (FIG. 1) rotates or cycles the light of a virtual image through polarization orientation angles before the light is reflected into the waveguides of the imaging structure 100. The polarization switch rotates the polarization of the light to time-sequentially create the wider field of view based on a combination of the waveguides different fields of view.

At block 504, the light that enters a waveguide at the first polarization orientation angle is reflected in the waveguide. For example, the polarizing beam splitter 116 that is integrated in the waveguide 102 reflects the light of the virtual image that enters the waveguide at the first polarization orientation angle to propagate the light in the waveguide. Similarly, the polarizing beam splitter 120 that is integrated in the waveguide 104 reflects the light of the virtual image that enters the waveguide at the first polarization orientation angle to propagate the light in the waveguide.

At block 506, the light that enters the waveguide at the second polarization orientation angle is passed through the waveguide. For example, the polarizing beam splitter 116 that is integrated in the waveguide 102 passes the light of the virtual image that enters at the second polarization orientation angle through the waveguide to the half waveplate 118 and into the additional waveguide 104 as the polarization switch 114 rotates or cycles the polarization of the light through the first and second polarization orientation angles.

At block 508, the light that passes through the waveguide from the second polarization orientation angle is changed back to the first polarization orientation angle. For example, the half waveplate 118 changes the light of the virtual image (e.g., alters the polarization state of the light) back to the first polarization orientation angle before the light then enters the additional waveguide 104 at the first polarization orientation angle.

At block 510, the light that enters the additional waveguide at the first polarization orientation angle is reflected in the additional waveguide. For example, the polarizing beam splitter 120 in the additional waveguide 104 reflects the light of the virtual image that enters the waveguide at the first polarization orientation angle to propagate the light in the waveguide.

At block 512, a field of view of the waveguide is combined with a field of view of the additional waveguide for an overall wider field of view. For example, the waveguides 102 and 104 are implemented for see-through viewing of an environment, with the waveguide 102 having a first field of view and the additional waveguide 104 having a second, different field of view. The polarization of the light is rotated (e.g., rotated or cycled at block 502) to time-sequentially create the wider field of view from the combined fields of view of the waveguides. In embodiments, additional waveguides with different fields of view can be added to expand the overall field of view of an imaging unit, such as described with reference to FIG. 2. For example, blocks 506-512 can be repeated for additional waveguides.

Figure 6:
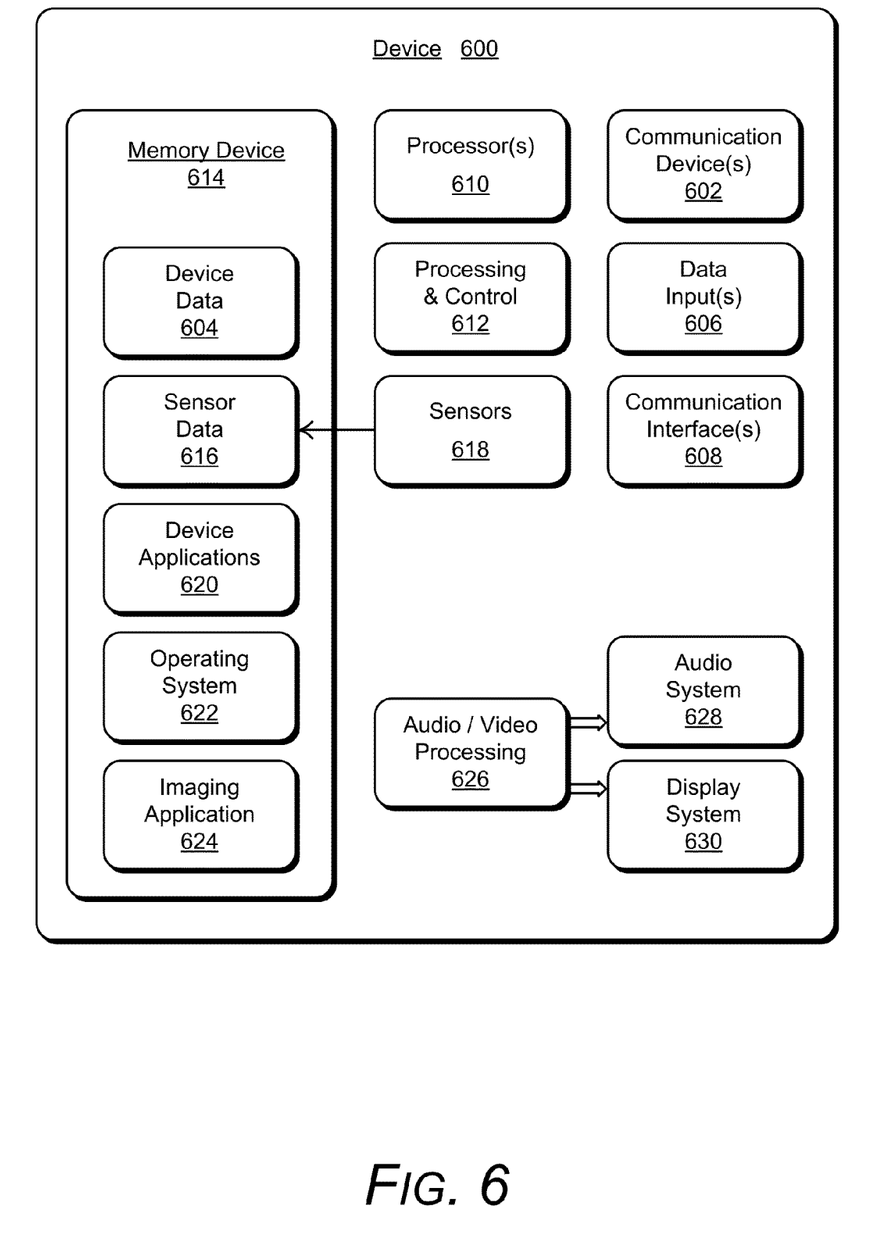
FIG. 6 illustrates various components of an example device that can implement embodiments of a multiple waveguide imaging structure.

FIG. 6 illustrates various components of an example device 600 that can be implemented as any of the devices described with reference to the previous FIGS. 1-5, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as virtual image data, as well as video and images data, and other media content stored on the device. The media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source. The data inputs 606 may include USB ports, coaxial cable, and other serial or parallel connectors (including internal connectors) for flash memory, DVDs, CDs, and the like. The data inputs can be used to couple the device to components, peripherals, and accessories, such as keyboards, microphones, cameras, and any other type of input devices.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 includes one or more processors 610 (e.g., any of microprocessors, controllers, and the like), or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 612.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, sensor data 616 from sensors 618 and other data input devices, such as cameras, other types of information and/or data, and device applications 620. For example, an operating system 622 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 624 that can implement embodiments of a multiple waveguide imaging structure as described herein.

The device 600 may also include an audio and/or video processing system 626 that generates audio data for an audio system 628 and/or generates display data for a display system 630. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although embodiments of a multiple waveguide imaging structure have been described in language specific to features and/or methods, the appended claims are not necessarily limited to the specific features or methods described. Rather, the specific features and methods are disclosed as example implementations of a multiple waveguide imaging structure.

The invention claimed is:

1. An imaging structure, comprising:
a first waveguide configured for see-through viewing of an environment at a first field of view;
a second waveguide configured for see-through viewing of the environment at a second field of view;
the first and second waveguides each including a polarizing beam splitter configured to reflect light that enters at a first polarization orientation angle in the respective first and second waveguides, and the polarizing beam splitters further configured to pass through the light that enters at a second polarization orientation angle; and
a polarization switch configured to cycle the polarization of the light through the first and second polarization orientation angles.

2. An imaging structure as recited in claim 1, wherein:
the light that enters the first and second waveguides at the first polarization orientation angle is propagated in the respective first and second waveguides; and
the light that enters the first waveguide at the second polarization orientation angle is passed through the first waveguide and is reflected into the second waveguide.

3. An imaging structure as recited in claim 2, further comprising a half waveplate configured to change the light that passes through the first waveguide from the second polarization orientation angle back to the first polarization orientation angle, and wherein the light enters the second waveguide at the first polarization orientation angle.

4. An imaging structure as recited in claim 1, wherein the first field of view of the first waveguide is combined with the second field of view of the second waveguide for a wider field of view.

5. A method, comprising:
cycling light through first and second polarization orientation angles;
reflecting the light that enters a first waveguide at the first polarization orientation angle, the first waveguide configured for see-through viewing of an environment at a first field of view;
passing the light that enters the first waveguide at the second polarization orientation angle through to a second waveguide configured for see-through viewing of the environment at a second field of view; and
changing the light that passes through the first waveguide from the second polarization orientation angle back to the first polarization orientation angle before the light then enters the second waveguide at the first polarization angle.

6. A method as recited in claim 5, further comprising:
propagating the light in the first waveguide that enters at the first polarization orientation angle; and
propagating the light in the second waveguide that is passed through the first waveguide at the second polarization orientation angle.

7. A method as recited in claim 5, further comprising combining the first field of view of the first waveguide with the second field of view of the second waveguide for a wider field of view.

8. An imaging structure, comprising:
a polarization switch configured to cycle light through first and second polarization orientation angles;
a polarizing beam splitter configured to reflect the light that enters a first waveguide at the first polarization orientation angle, the first waveguide configured for see-through viewing at a first field of view, the polarizing beam splitter further configured to pass the light that enters the first waveguide at the second polarization orientation angle through to a second waveguide configured for see-through viewing at a second field of view; and
a half waveplate configured to change the light that passes through the first waveguide from the second polarization orientation angle back to the first polarization orientation angle before the light then enters the second waveguide at the first polarization angle.

9. The imaging structure as recited in claim 8, wherein:
the first waveguide is configured to propagate the light that enters at the first polarization orientation angle; and
the second waveguide is configured to propagate the light that is passed through the first waveguide at the second polarization orientation angle.

10. The imaging structure as recited in claim 8, wherein:
the light that enters the first and second waveguides at the first polarization orientation angle is propagated in the respective first and second waveguides; and
the light that enters the first waveguide at the second polarization orientation angle is passed through the first waveguide and is reflected into the second waveguide.

11. The imaging structure as recited in claim 8, wherein the first field of view of the first waveguide combines with the second field of view of the second waveguide for a wider field of view.

12. The imaging structure as recited in claim 8, further comprising:
an additional polarizing beam splitter configured to reflect the light that enters the second waveguide at the first polarization orientation angle, the additional polarizing beam splitter further configured to pass through the light that enters the second waveguide at the second polarization orientation angle.

* * * * *